C. L. TOLLES.
TURRET TOOL POST.
APPLICATION FILED SEPT. 1, 1916.

1,236,997.

Patented Aug. 14, 1917.

WITNESSES

INVENTOR
CHARLES L. TOLLES
BY
ATTORNEYS

UNITED STATES PATENT OFFICE.

CHARLES LYMAN TOLLES, OF EAU CLAIRE, WISCONSIN.

TURRET TOOL-POST.

1,236,997.     Specification of Letters Patent.     Patented Aug. 14, 1917.

Application filed September 1, 1916. Serial No. 118,023.

*To all whom it may concern:*

Be it known that I, CHARLES L. TOLLES, a citizen of the United States, resident of Eau Claire, county of Eau Claire, and State of Wisconsin, have invented certain new and useful Improvements in Turret Tool-Posts, of which the following is a specification.

The object of my invention is to provide a tool post adapted for use on a lathe carriage and easily and quickly mounted for turning, threading, etc., and revolved about the axis of the post without re-adjustment in its support.

A further object is to provide a tool post of simple construction composed of but few parts and easily assembled.

The invention consists generally in various constructions and combination, all as hereinafter described and particularly pointed out in the claims.

Figures 1, 2:
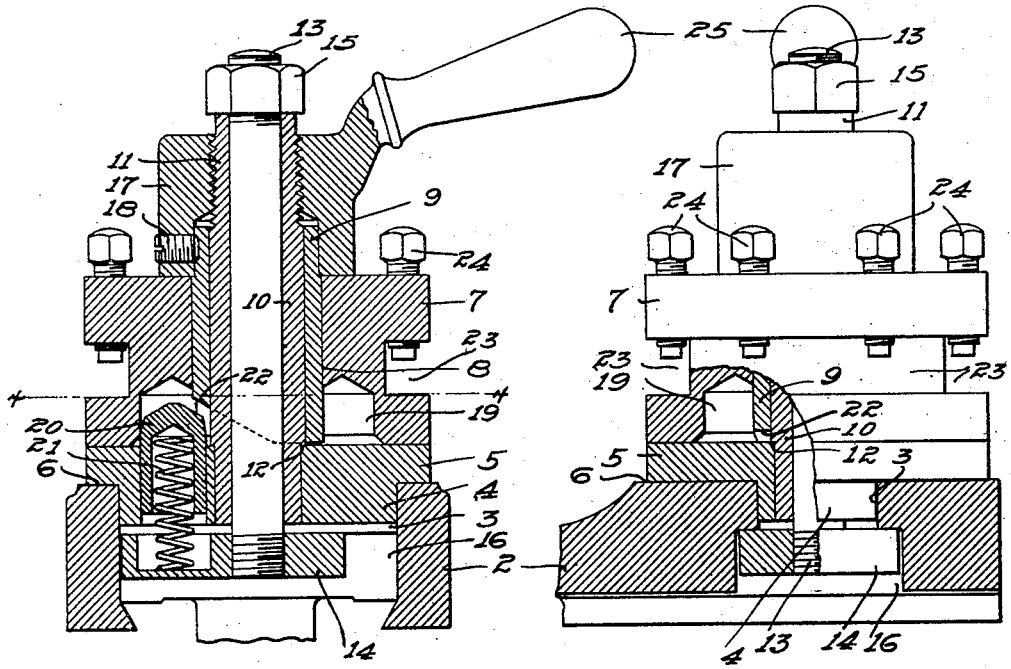
Figures 3, 4:
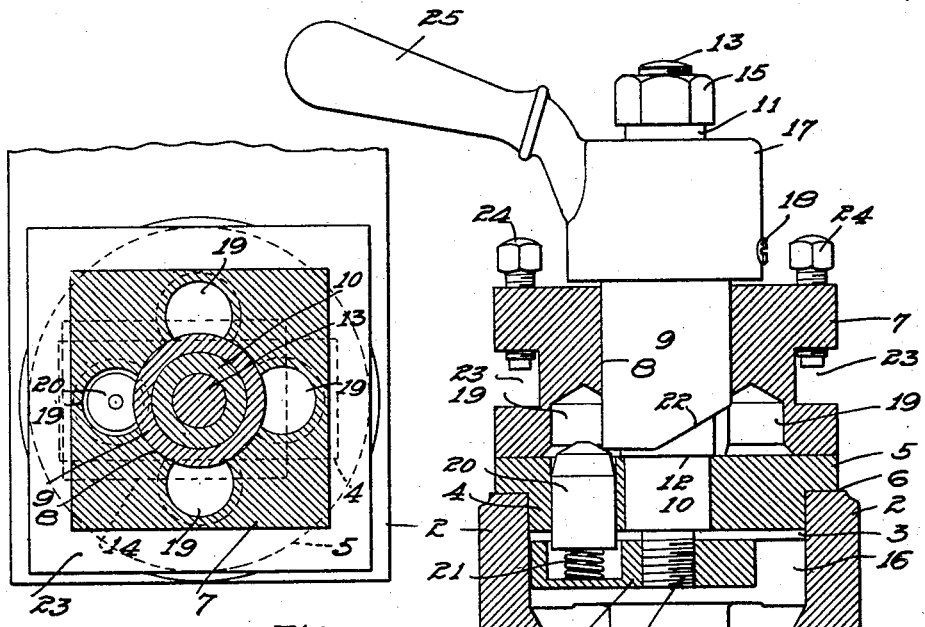

In the accompanying drawings forming part of this specification,

Figure 1 is a vertical sectional view through a tool post embodying my invention, Fig. 2 is an elevation of the post, showing the wall broken away to illustrate the arrangement of the parts, Fig. 3 is a horizontal sectional view on the line x—x of Fig. 1, Fig. 4 is a vertical sectional view, showing the indexing pin in a different position from that illustrated in Fig. 1.

In the drawing, 2 represents a slide, seated on the bed of the lathe (not shown) and having a rectangular opening 3 therein in which the correspondingly shaped lower end 4 of the base block 5 is mounted. A shoulder 6 is formed on this plate and seated on the slide 2. 7 is a head, having a central opening 8 therein and 10 is a sleeve fitting within said opening and having a threaded portion 11 near its upper end and a shoulder 12 near its lower end that is seated on the block 5. A bolt 13 is fitted within the sleeve 10 and threaded at both ends and has a nut 14 at its lower end and a lock nut 15 at its upper end, the latter bearing on the upper end of the sleeve 10 and operating to hold it downwardly upon the block 5. The nut 14 fits within a recess 16 formed in the slide and when the nut 15 is tightened, the sleeve 10, the block 5 and the slide will be firmly clamped together. A nut 17 has a socket therein to receive the threaded end 11 of the sleeve 10 and the upper end of the sleeve 9, being secured to said sleeve by suitable means, such as a set screw 18. The under face of the head 7 is provided with a series of sockets 19 and a pin 20 is mounted to slide in a block 5 and is normally held in its raised position by a spring 21 which is seated in the nut 14 and extends upwardly within a recess in the pin 20. The upper end of the pin is beveled and the lower end of the sleeve 9 has an inclined surface 22 in position to contact with the pin 20 and depress it against the tension of its spring. This pin forms the usual indexing device of the post. The head 7 is provided with a series of recesses 23 having set-screws 24 by means of which tools of different kinds may be locked in the head.

In using the post, the tool is secured in the head 7 and upon revolving the nut 17 on the sleeve 10 by means of the lever 25 in one direction the head 7 will be firmly clamped upon the base block 5. When the nut 17 is revolved in the opposite direction and the head released, the sleeve 9 will be raised and the inclined surface 22, contacting with the spring-pressed pin, will allow the tool to be indexed in another position.

I claim as my invention;

1. A tool post comprising a block, a head mounted thereon, a spindle forming an axis for said head on said block, a sleeve inclosing said spindle, a second sleeve inclosing said first named sleeve within said head and having a cam surface at its inner end, means for rotating said second sleeve and raising and lowering it, and an indexing pin in the path of said cam surface.

2. A tool post comprising a block, a head mounted thereon, a spindle passing through said head and block for securing them together, a sleeve inclosing said spindle and having a threaded end, a second sleeve inclosing said first named sleeve within said block, a nut mounted on said second sleeve and engaging said threaded end for raising or lowering said second named sleeve thereon, said second named sleeve having an inclined surface at its lower end, an indexing pin mounted in said block in the path of the inclined surface on said sleeve, and said head having sockets at intervals to receive said pin.

3. The combination, with a lathe slide having an opening therein, of a block fitting within said opening and seated upon said slide, a tool-carrying head mounted on said block, a sleeve fitting within an orifice in said head and seated in said block, a spindle fitting within said sleeve and having threaded ends and nuts therefor, the upper nut engaging said sleeve for drawing said other nut against said block, a second sleeve encircling said first named sleeve within said head and slidable therein, and an operating handle locked on said second sleeve and having a threaded engagement with said first named sleeve.

4. A tool post comprising a block, a head mounted thereon, a spindle forming an axis for said head on said block, sleeves concentrically mounted on said spindle, means for revolving one of said sleeves and imparting a vertical movement thereto, an indexing pin mounted in said block to enter recesses in said head, one of said sleeves having means for engaging said indexing pin.

5. A tool post comprising a block, a head mounted thereon, a spindle forming an axis for said head on said block, inner and outer sleeves mounted on said spindle within said head, said inner sleeve having a threaded end, an operating handle locked on said outer sleeve and having a threaded engagement with said inner sleeve for rotating said outer sleeve and raising and lowering it on said inner sleeve, and an indexing pin in the path of said outer sleeve.

In witness whereof I have hereunto set my hand this 29th day of August, 1916.

CHARLES LYMAN TOLLES.

Witnesses:
F. C. BARLOW,
RUSSELL IRISH.

Copies of this patent may be obtained for five cents each, by addressing the "Commissioner of Patents, Washington, D. C."